United States Patent Office 2,865,766
Patented Dec. 23, 1958

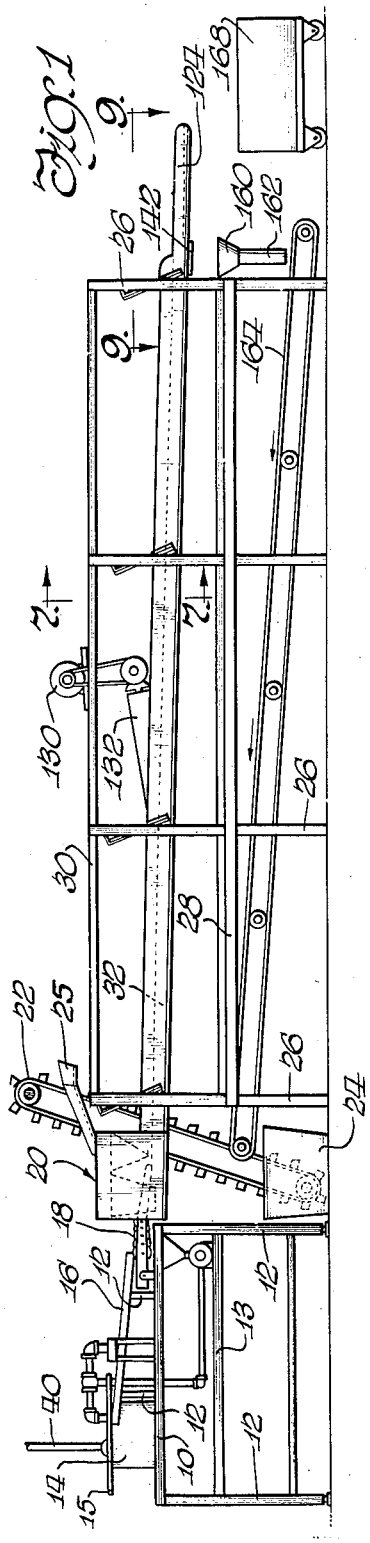
Dec. 23, 1958   G. CHRISTIANSON ET AL   2,865,766
APPARATUS FOR COATING FRAGILE FOODS
Filed March 28, 1955   3 Sheets-Sheet 1
Inventors
George Christianson
Bill Nichols
Richard W. Rath
by Bair, Freeman & Molinare
Attorneys Dec. 23, 1958    G. CHRISTIANSON ET AL    2,865,766
APPARATUS FOR COATING FRAGILE FOODS
Filed March 28, 1955    3 Sheets-Sheet 2
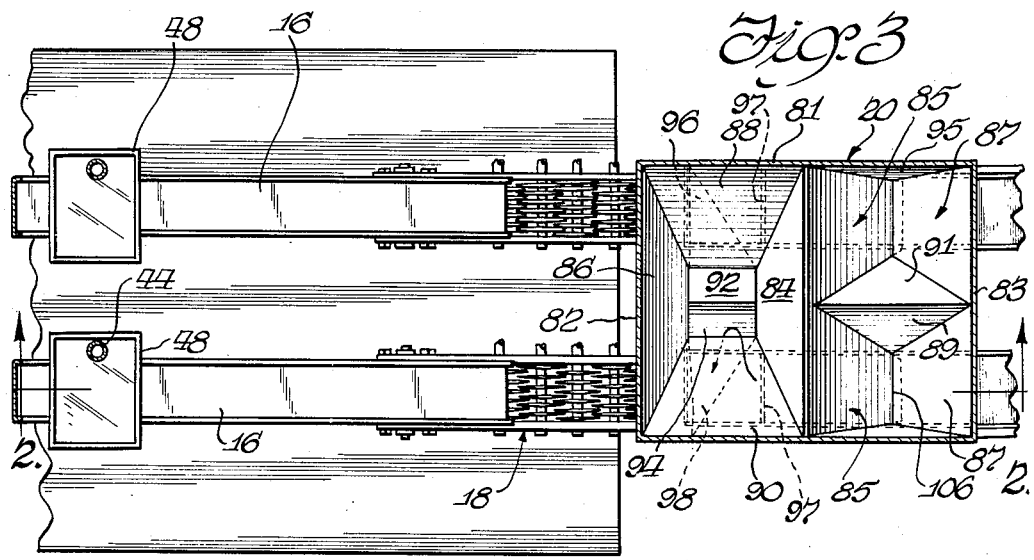
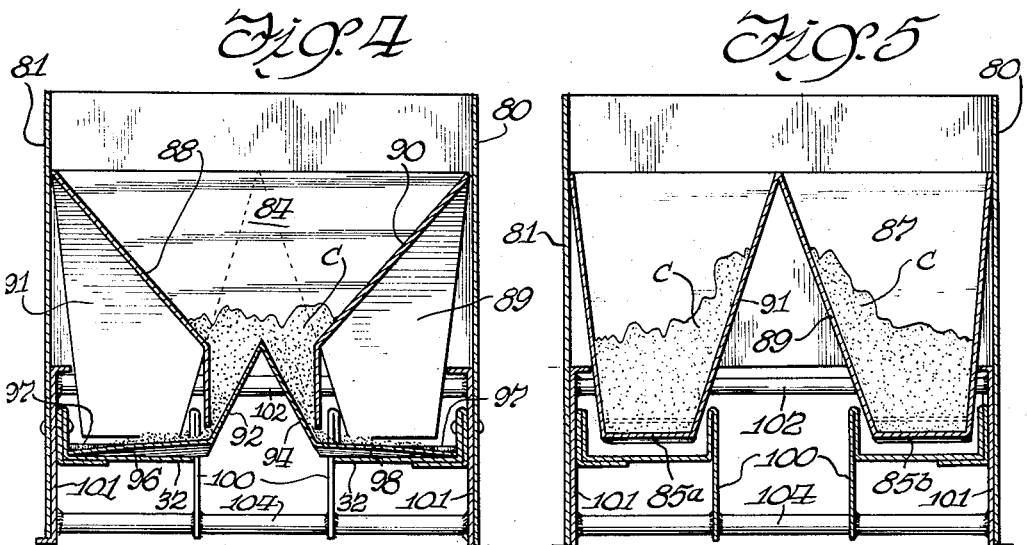
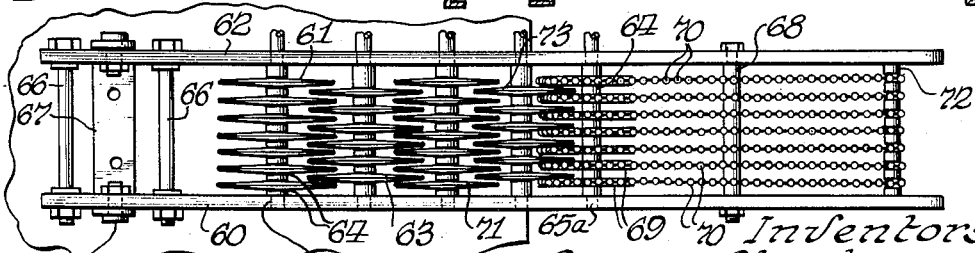
Inventors
George Christianson
Bill Nichols
Richard W. Rath
by Bair, Freeman & Molinare Attorneys Dec. 23, 1958     G. CHRISTIANSON ET AL     2,865,766
APPARATUS FOR COATING FRAGILE FOODS
Filed March 28, 1955     3 Sheets-Sheet 3
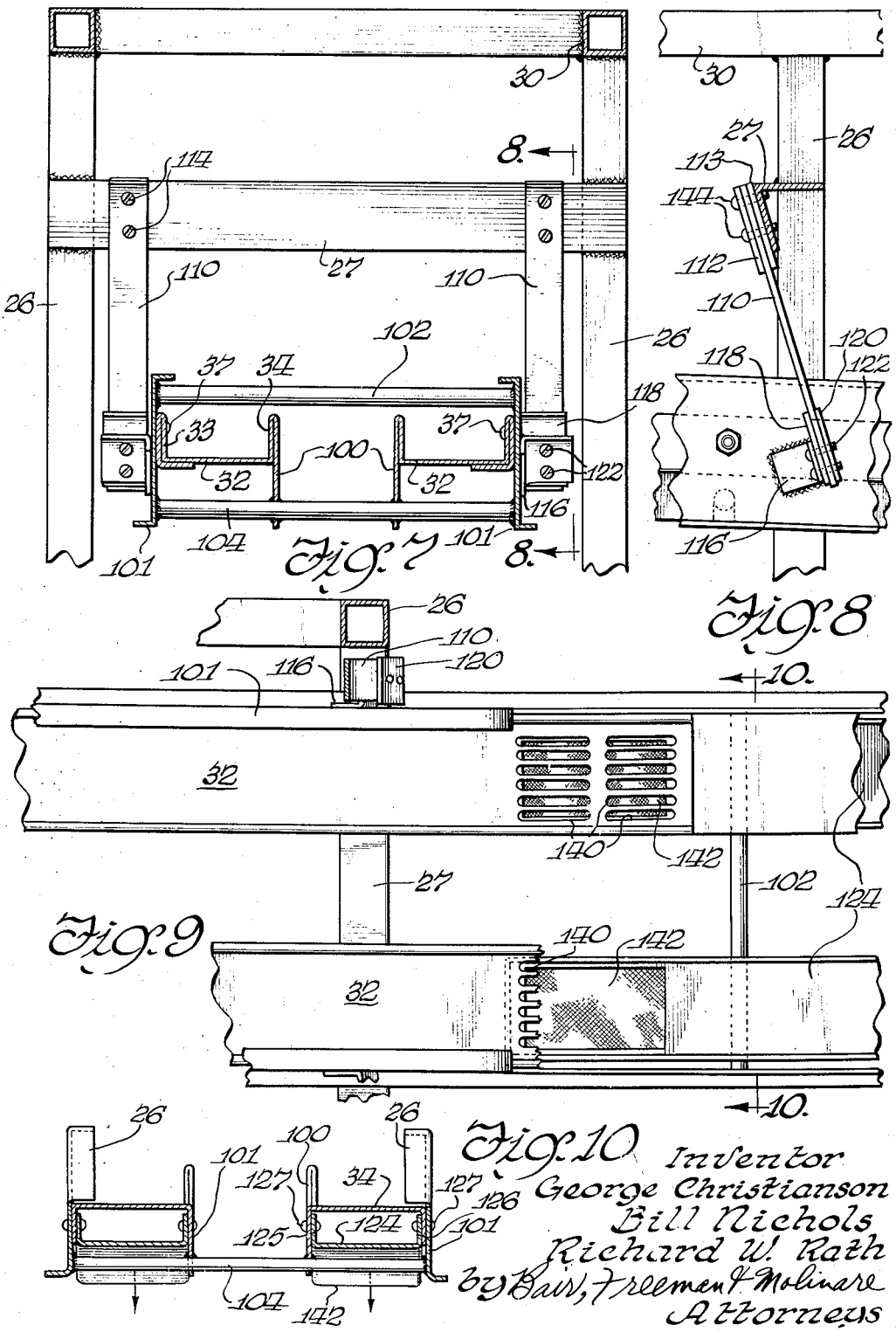

2,865,766

APPARATUS FOR COATING FRAGILE FOODS

George Christianson, Bill Nichols, and Richard W. Rath, Waterloo, Iowa, assignors to The Rath Packing Company, Waterloo, Iowa, a corporation of Iowa Application March 28, 1955, Serial No. 497,110

8 Claims. (Cl. 99—169)

This invention relates to coating articles and more particularly to a method and apparatus for continuously applying a liquid adhesive to generally flat fragile articles and for subsequently applying dry comminuted material as an external coating over the liquid adhesive. The invention is particularly useful in breading comminuted meat products in which the meat is coated with liquid batter, and subsequently with dry crumbs of crackers, bread or the like, although it will become apparent that the invention is useful for other similar coating applications. Heretofore, shaped comminuted meat products, such as chop-shaped pork patties, veal patties, or similar fragile comminuted meat articles, were breaded by manual operation, that is, the patties were immersed in the batter, drained, and then dipped into or sprinkled with the dry crumbs. This method involves a considerable amount of labor and results frequently in the distortion of the fragile shaped meat because of mishandling.

One of the primary objects of this invention is to provide a continuous method and apparatus for breading meat products of this kind without any manual assistance.

Another object is to provide a continuous process and apparatus for successively applying separate liquid and dry coatings to fragile articles, such as flat shaped comminuted meat products, without tearing or distorting the meat and without turning the meat over during the coating operation.

Another object is to provide a method in which the articles to be coated are advanced from one station to another through the apparatus by depositing the article on an inclined surface carrying a moving layer of the coating material.

Another object is to provide an apparatus for applying an excessive quantity of separate liquid and dry solid coatings to fragile articles in which the excess liquid coating is drained off prior to application of the dry coating, and the excess dry coating is removed by vibration.

A further object is to provide a novel transfer conveyor for handling tender liquid coated articles and on which excess liquid is permitted to drain off as the articles are advanced and deposited gently on a supporting surface.

A further object is to provide a novel transfer conveyor of this type consisting of cooperating rows of thin laterally-spaced rotatable discs, for intermittently supporting the articles, and adjoining a bead chain conveyor trained over a small diameter roller at the discharge end for depositing the fragile article onto a supporting surface with a minimum drop.

These and other objects will become apparent from the following detailed description when read in connection with the accompanying drawings, in which:

Figure 1 is a semi-diagrammatic side view of the apparatus of the invention;

Figure 2 is a side view, partly in section, of the head end of the apparatus shown in Figure 1, illustrating means for applying the liquid and dry coatings;

Figure 3 is a sectional view taken along the line 3—3 of Figure 2;

Figure 4 is a sectional view taken along the line 4—4 of Figure 2;

Figure 5 is a sectional view taken along the line 5—5 of Figure 2;

Figure 6 is a plan view of a transfer conveyor provided for advancing fragile liquid-coated articles from one supporting surface to another while permitting excess liquid to drain from the articles;

Figure 7 is a sectional view taken along the line 7—7 of Figure 1 showing the means for suspension of the troughs;

Figure 8 is a sectional view taken along the line 8—8 of Figure 7;

Figure 9 is a sectional view taken along the line 9—9 of Figure 1; and

Figure 10 is a sectional view taken along the line 10—10 of Figure 9.

The invention lies in the utilization of the liquid and solid coating materials as vehicles for advancing the articles to be coated through the apparatus. In accordance with the invention comminuted meat patties, for example, are "floated" down an inclined chute by depositing them in a stream of batter flowing through the chute. The patties do not actually float in the sense of being buoyed to the surface of the liquid because the liquid is not sufficiently deep for this purpose, but a continuous layer of the liquid flows down the trough and carries the patties with it. Without the liquid batter coating, the comminuted meat patty would stick to the bottom of the trough. The underside of the meat patty becomes completely coated with batter as the patty journeys down the trough. A reservoir filled with batter mounted above the trough supplies liquid to coat the top side of the patties as they pass beneath the reservoir, thus accomplishing all of the coating and conveying without any manual handling.

The liquid coated patties are then gently transferred by novel conveyor means to an inclined trough having a coating of cracker crumbs or the like on the surface thereof. Any excess batter on the surface of the patties is drained off and recovered during the transfer period prior to deposition on the trough. Good drainage is imperative to prevent the excess liquid from running into and coagulating the crumbs. Upon contacting the crumbs in the trough, the bottom side of the patty becomes coated with the crumbs, which are adhered thereto by the batter. The crumbs, being dry and relatively slippery, serve to slide the patty down the incline upon vibration of the trough. The inclination of the trough is not steep enough to cause the patty to slide by gravity without the aid of vibration. The top sides of the patties then may be coated as they pass beneath a hopper mounted above the trough and adapted to drop crumbs thereon. In traversing the remaining distance to the end of the trough, the excess crumbs are shaken off and recovered for further use. The crumbs which remain adhered to the patty become integral with the patty because of the vibration. The completely breaded meat product is then placed in packages and quick frozen.

Referring now to the drawings, the apparatus includes a supporting table 10 on which the meat-shaping machines 14, the liquid coating chutes 16, and the transfer conveyors 18 are mounted. Table 10 has legs 12 with adjustable feet to permit modifying its height with respect to the troughs 32. The machine 14 for shaping the comminuted meat is fed continuously by a stuffer through the line 40. The meat is forced into a die opening or cavity, having the desired peripheral configuration, cut through the reciprocating plate 15. The shaped product is equal in thickness to plate 15 and is pushed out of the cavity by a suitable ejector means, not shown. The comminuted meat may be shaped into round patties or into similar flat shapes of pork-chop or lamb-chop configuration as imparted by the cavity in the plate 15. The plate 15 usually contains a plurality of die openings for rapid delivery. Suitable machines for this purpose are sold commercially, and need not be described in detail herein. Any suitable alternative means may be employed to provide the shaped articles to be coated.

The shaped comminuted meat is plastic and will retain the shape imparted thereto by the mold of the machine 14 only if handled very carefully. It is well known how easily shaped meat patties may be distorted, divided or torn.

The apparatus illustrated in the drawings is adapted for processing two continuous files of meat patties, but it will be understood that any number of parallel lines may be employed. For the sake of convenience in describing the apparatus, only one line will be referred to, it being understood that the second line parallel thereto is identical in structure. In other words, there are two machines 14, two chutes 16, two conveyors 18, etc., arranged side by side.

The machine 14 is adapted to deposit shaped meat patties M on the inclined chute 16 a short distance from the upper end thereof, the chute being mounted by suitable supports 13 on the table 10. A suitable liquid adhesive B, such as milk-egg batter, is supplied continuously to the upper end of the chute 16 through the left branch 42 of the T-shaped pipe assembly, as best shown in Figure 2. A pump 56 moves batter upwardly through the vertical pipe member 46 of the T and the batter flows continuously in volumes determined by the speed at which it is pumped. The batter forms a layer over the bottom of the chute 16. The patties M are dropped with the flat side in contact with the flowing layer of batter and are conveyed thereby to the discharge (right) end of the chute, as shown in Figure 2. The speed at which the patties travel down the chute is coordinated with the number of patties produced by the machine 14 and may be regulated by changing the volume of the batter flowing through the chute, i. e. the swiftness of the stream, and/or its angle of inclination.

The other branch 44 of the T piping arrangement discharges batter into a reservoir 48 mounted directly above the chute 16 on supports 52 secured to the surface of the table 10. The reservoir 48 has a series of openings 50 through which liquid B spills onto the top side of patties passing beneath the reservoir in the chute. Any suitable means for supplying liquid continuously to the top side of the patties may be employed. A large hopper 54 is provided below the discharge end of the chute having its open end extending up through the surface of the table top 10 for catching the batter that flows off the end of the chute. The hopper 54 also catches the excess batter that drains from the patties moving on the conveyor 18, as mentioned hereinafter. Fresh batter is charged into the hopper 54 as required. A suitable sanitary pump 56 is connected on its intake side to the hopper 54 through line 55 and on its discharge side to line 46 through the horizontal line 58. The hopper and the pump are fixed to the frame 12, 13 of the table. Suitable power means (not shown) is provided for operating the pump. The flow of batter from pipes 42 and 44 may be conveniently regulated by varying the speed of the pump, or by providing orifices of desired size in the pipes while running the pump at constant speed.

We have found that if the patties are moved down the chute in a swiftly-moving heavy stream of liquid, the liquid washes over the top side of the patty as its speed is abruptly decreased upon dropping to the conveyor 18. This abrupt decrease in speed is only momentary until the patty makes contact with the conveyor and is once again advanced at normal speed. If the liquid is of relatively low viscosity, the topside may be conveniently coated in this way without the provision of the reservoir 48. With more viscous liquid adhesives the above-described reservoir system is preferred.

The patties M are discharged from the end of the chute 16 with considerable excess batter thereon which must be drained off. This is accomplished by providing a novel transfer conveyor 18 which permits simultaneously draining and conveying the fragile meat patties without distortion to the next station of the apparatus. The transfer conveyor has a frame consisting of a pair of spaced upright opposed plates 60, 62 which are secured by means of a plurality of transverse bolts 66 at the left end and bolts 68 at the right end, as shown in Figures 2 and 6. The frame members or plates 60, 62 preferably become narrower and turn downwardly at a slight angle near the discharge (right) end. The left end of the frame is pivotally mounted by a pin or bolt 59 extending through the upright members of a U-shaped bracket 67 secured to the table 10. The left-hand half of the conveyor consists of four rows of laterally-spaced discs 61, 63, 71, 73 fixedly mounted on transverse driven shafts 65 rotatably journalled in openings provided therefor in the side plates 60 and 62. Preferably, the discs are tapered, the thickness gradually being reduced from center to circumference, to facilitate drainage. The discs are separated from each other and from the frame members by means of short lengths of tubing or rings 64 of suitable width. The discs are preferably made from stainless steel or other material which is not subject to rust or corrosion and which can be easily cleaned. The circumferences of the adjacent rows of discs overlap, the discs being laterally spaced on the shafts so that they nest or interleaf with each other, as shown in Figure 6. The discs at the left end of the conveyor are larger in size than those at the right end of the conveyor and the diameters are progressively reduced, that is, the discs 63 are of slightly smaller diameter than the discs 61, the discs 71 are of slightly smaller diameter than the discs 73, and so forth. The shafts 65 are driven through suitable well known gearing and power means (not shown) which are adapted to rotate each row of discs at different speeds in proportion to the disc diameter. The smaller discs rotate more rapidly than the larger discs so that the linear speed of the circumferences, on which the patties travel, is equal. The number of rows of discs may be varied, of course, in accordance with the length of the conveyor. The right end of the transfer conveyor, which turns downwardly to join the trough 32, consists of a series of spaced endless bead chains 70 which are trained over pulleys 69 mounted on driven rotatable shaft 65a at the left end and on relatively small diameter idler roller 72 at the discharge end. Roller 72 has spaced recesses therein for receiving the chains 70. As previously indicated, the side plates 60 and 62 are of decreasing height toward the right end of the conveyor so as to permit the bead chain at its discharge end to be disposed as closely as possible to the supporting surface on which the meat products are to be deposited from the conveyor. It is essential that the drop from the end of the conveyor to the supporting surface, such as the trough 32, be as small as possible, thus preventing distortion of the meat patties.

It will be noted that the left-hand section of the conveyor 18 is mounted directly over the hopper 54 to facilitate catching all of the batter which runs off of the meat patties and down the thin discs during transfer to the next station. It is important that the drainage be effectively accomplished so that the adhesive batter does not drain into the crumbs on the trough 32.

For carrying out the breading operation in which crumbs are applied to both sides of the flat shaped comminuted meat patties, a pair of longitudinal troughs 32 is provided, being supported on a frame consisting of a plurality of upright members 26 and longitudinal members 28 and 30. Each trough is mounted for vibration on flat metal springs 110 or the like which are secured at one end to the frame and at the other end to the trough supporting plates, as will be described hereinafter. As shown in Figure 2, the right-hand end of the conveyor 18, which consists of the bead chain conveyor portion, extends over the left end of the trough 32 which is elevated slightly above the right end. A double hopper is mounted on and above both parallel troughs and is adapted to supply both with crumbs C as the troughs (and the hopper) are vibrated. The hopper serves to store and deposit crumbs on the surface of the trough on which the liquid batter coated patties are laid by the transfer conveyor, and also on the top side of the patties. As shown in Figures 2, 3, 4 and 5, the hopper has four vertical side walls comprising two side plates 80 and 81 and two end plates 82 and 83. The side plates are secured to the longitudinal opposed plate members 101 which support the troughs 32. The plate members 101 are secured in spaced relation by means of a plurality of lower tubes 104 and upper tubes 102 welded to the inner sides thereof. The space defined by the four vertical sides of the hopper is divided into two hopper compartments by means of central transverse panels 84, 85 which slope longitudinally outward from the center of the hopper. The forward hopper compartment has transverse side walls 84 and 86 which slope toward the center of the compartment from the top edge thereof, and side walls 88 and 90 which slope inwardly in a transverse direction. A small square central opening is defined by the lower edges of these four panels through which the crumbs fall and are divided in two portions, half flowing to one trough and half to the other trough. Sloping longitudinal walls 92 and 94, which are joined in an apex just below the square opening in the bottom of the forward hopper serve to direct the flow of crumbs as indicated. Walls 92 and 94 terminate in generally horizontal edges which extend over the inner edge of the troughs beneath the conveyors 18. To insure distribution of the crumbs across the width of the troughs, the portions 96, 98 thereof, directly beneath the forward hopper compartment, slope rearwardly, as indicated in Figures 2 and 4. A ridge 97 extends across the trough at the line where the trough slopes toward the rear of the machine. The crumbs must build up in the trough portions 96, 98 and spill over the ridge due to vibration before advancing down the trough. Thus, distribution of the crumbs across the entire width of the trough is insured. The patties are dropped from conveyor 18 on the trough rearwardly of the ridge 97, which is completely coated with a layer of crumbs by reason of this arrangement.

The rearward hopper compartment is divided longitudinally by downwardly sloping sides 89 and 91. The crumbs which follow the incline of sloping panel 91 are directed to the left-hand trough and those following the panel 89 are directed to the right-hand trough, Figure 5. Outer longitudinal inclined panels 95 and 93 oppose panels 89 and 91. Transverse panels 85 and 87 extend entirely across the apparatus beneath panels 89, 91 and 93, 95. Panel 87 terminates at edge 106 which overlaps panel 85, as best shown in Figures 2 and 3, providing a small space through which the crumbs may fall.

A lip 85a (Figure 2) extending from the lower end of the panel 85 across the width of the trough directs the flow of the crumbs on the top side of the patties passing beneath the forward hopper compartment.

As shown in Figure 7, the troughs 32 may be formed from a single piece of metal which is doubled over on itself to form the side walls 33, 34 of the trough and the downwardly depending flange 100, which is secured, as by welding, to rods 104 which extend through the lower portion of the flange at longitudinally spaced intervals. The outside wall 33 of the trough is reinforced by bending the sheet from which the trough is made inwardly at right angles to support the outer margin of the trough bottom. The outer sides of the trough are secured to longitudinal plates 101 by means of rivets or bolts 37, or may be welded, as desired. The longitudinal plates 101 are, of course, coextensive with the troughs and serve as the main supports for the troughs. The plates 101 are held in spaced relation by a plurality of rods 102, 104 spaced longitudinally and welded to the inner surface of the opposed plates. The top and bottom margins of the plates 101 may be bent at right angles to increase the rigidity of the plates.

Thus, the spaced plates 101 and the twin troughs 32 are integral and may be mounted on the frame of the machine by means of flat metal springs 110 or the like. The springs 110 are preferably made from stainless steel and are secured at their upper ends to angle cross members 27 welded to the frame uprights 26. As shown in Figure 8, the angle between legs of the angle member 27 is less than a right angle which causes the spring 110 secured thereto to be tilted at an angle of about 15° to 30° from the vertical. The spring 110 is sandwiched between a pair of plates 112, 113 which are riveted or bolted to the rear face of the angle support 27. The lower end of the spring 110 is sandwiched between plates 118, 120 in similar fashion to the upper end and is secured to a right angle bracket 116 by means of rivets 122 or similar fasteners. The bracket 116 is welded to the outside of the longitudinal plate 101. From Figure 1 it will be noted that the troughs are suspended from a series of four pairs of such springs, each pair being connected to laterally-spaced upright frame members 26. The troughs are vibrated on the springs essentially in an elliptical path, but in a vertical plane. The path of the motion is not critical. To provide the proper vibration desired for advancing the crumbs in the troughs, a suitable eccentric vibrating device 132 is mounted on the frame of the machine and is driven by an electric motor 130 or other source of power. The device 132 is secured to the side plates 101 by means not shown. Any suitable means for providing vibration may be employed. A frequency of from 800 to 900 vibrations per minute and an amplitude of about three-sixteenths to three-eighths inches have been found to be satisfactory for purposes of the invention. This frequency and amplitude provide a flutter- or quiver-like movement of the troughs, as distinguished from the relatively low frequency, high amplitude movement which produces tumbling or bouncing action.

At the right-hand or discharge end of the apparatus the troughs 32 are provided with longitudinal slots 140 in the bottom thereof spaced across their width. These slots serve to remove the excess crumbs which flow down the trough with the coated comminuted meat product. The slots are relatively wide so that all crumbs, even those which have been coagulated to some extent into small balls by the batter, will fall through into lump-catching means provided beneath the slots. The lump-catching means consists of a screen or strainer 142 forming a depressed area in the bottom of the crumb chute 124, secured to the trough, as best shown in Figure 10. The sides 125, 126 of the crumb chute are fixed to plates 100, 101 by means of rivets or bolts 127, beneath the trough 32, and the outer end of the chute extends beyond the end of the trough 32.

A hopper 160, as shown in Figure 1, is disposed beneath the screen 142 for catching the fines that fall therethrough. The hopper is of Y-shaped construction and services both troughs. The lower end of the hopper 162 takes the form of a tube which directs the flow of the fines to a single belt conveyor 164, mounted on the lower portion of the main frame between uprights 26 beneath the troughs. The conveyor is adapted to move the fines into the crumb container 24 beneath the hoppers 20 near the head end of the machine. A bucket elevator 22 mounted on the far side of the apparatus dips into the container 24 and raises the crumbs above the machine and deposits them in a trough 25 which has its lower end connected to the crumb hopper 20 from which the troughs 32 are fed. The construction of the bucket elevator is conventional and need not be described in detail since it forms no part of this invention.

If the length of the apparatus is such that the slope from the hopper 20 to the lower end of the tube 162 is not too great, the forward end of the conveyor 164 may be raised between the parallel spaced troughs 32 to a height above the hopper 20. This construction permits conveying the crumbs directly to the hopper and eliminates the necessity for bucket elevator 22.

The crumbs which have lumped up flow from the discharge end of the chute 124 into a truck 168 where they may be again reduced in size and charged back into the crumb container 24 along with fresh crumbs.

The operation of the apparatus will be apparent from the foregoing description and a detailed recitation of the operation is not necessary. It should be emphasized, however, that the vibration of the troughs 32 also causes the parts connected thereto to vibrate, including the hopper 20 and the crumb chute 124. Thus, crumbs continually flow from the hopper due to vibration, form in a smooth, even layer over the bottom of the troughs 32 and advance to the crumb chute from which they are discharged, either as fines into the hopper 160, or as lumps into the truck 168. The batter coated patties deposited on the layer of crumbs slide down the troughs due to vibration and are manually removed at the end of the trough. The vibration also removes the excess crumbs from the patties, and causes the adhered crumbs to bury themselves in the surface and become an integral part of the patty.

All of the parts of the apparatus which are to contact the edible materials in the process are preferably made from stainless steel, glass or plastics which will not corrode and are easily cleaned. Of course, where the articles being processed are not food products, this requirement is not as important. Other changes in materials and in the construction and arrangement of the parts of the apparatus will be apparent to those skilled in the art without departing from the true spirit of our invention. It is, therefore, our intention to cover all modifications which may reasonably be included within the scope of the appended claims.

What we claim as new and desire to secure by Letters Patent of the United States is:

1. A method for applying comminuted dry material to a generally flat fragile article having an adhesive surface which comprises laying said article on an inclined surface having a layer of said dry material thereon with one face in contact with said layer, vibrating said surface with a relatively high-frequency low-amplitude movement to advance the article along the surface with its opposite face exposed, and simultaneously shaking additional comminuted dry material on said exposed face to completely coat said article.

2. A method for applying crumbs to a fragile generally flat compacted mass of meat having a batter coating on the surface thereof which comprises laying said meat mass on an inclined surface having a layer of crumbs thereon with one face in contact with said layer, vibrating said surface with a relatively high-frequency, low-amplitude movement to advance the meat mass along the surface with its opposite face exposed, and simultaneously shaking additional crumbs on said exposed face to completely coat said meat mass.

3. An apparatus for coating generally flat fragile articles with a liquid adhesive and an external layer of dry comminuted material comprising a first article support having an inclined surface, means for continuously flowing a stream of said liquid adhesive down said surface to advance the articles thereon and coat the underside thereof with the liquid, a reservoir mounted above said surface for supplying liquid to coat the top side of articles passing therebeneath, a second article support having an inclined surface mounted for vibration, means for applying a layer of said dry material on the surface of said second article support, means for vibrating said second article support, a hopper mounted on and above said second article support for supplying dry material to coat the top side of the articles and conveyor means for transferring said liquid-coated articles from said first article support to said second article support.

4. An apparatus for coating generally flat fragile articles with a liquid adhesive and an external layer of dry comminuted material comprising an inclined chute, means for continuously flowing a stream of said liquid adhesive down said chute to advance the articles therethrough and coat the underside thereof with the liquid, a reservoir mounted on and above the chute for supplying liquid to coat the top side of articles passing therebeneath, a slightly-inclined trough mounted for vibration, means for applying a continuous layer of said dry material on the bottom of the trough, a hopper mounted on and above the trough for supplying dry material to coat the top side of the articles, means for vibrating said trough and hopper, and conveyor means for simultaneously draining and transferring said liquid-coated articles from said chute to said trough.

5. The apparatus of claim 4 in which the conveyor means comprises a plurality of rows of laterally-spaced discs, the discs in adjacent rows being interleafed and of progressively smaller diameter, a series of pulleys interleafed with the row of smallest diameter discs, a roller of very small diameter parallel with the axis of said pulleys, and endless bead chains trained over said pulleys and said roller.

6. The apparatus of claim 4 in which the trough is suspended on flat leaf-type springs for vibratory movement in a vertical plane.

7. The apparatus of claim 4 in which the trough contains spaced openings near the discharge end thereof for separating excess dry material from the articles advancing thereon.

8. The apparatus of claim 4 in which said hopper mounted on and above the trough is adapted to deposit dry material continuously on the surface of the trough as well as on the top side of said articles.

References Cited in the file of this patent

UNITED STATES PATENTS

| | | |
|---|---|---|
| 1,299,198 | Low et al. | Apr. 1, 1919 |
| 1,692,970 | Warnick | Nov. 27, 1928 |
| 1,778,267 | McArthur | Oct. 14, 1930 |
| 1,808,810 | Finn | June 9, 1931 |
| 2,347,164 | Petrilli | Apr. 18, 1944 |
| 2,380,957 | Feldtkeller | Aug. 7, 1945 |
| 2,535,573 | Hettinger | Dec. 26, 1950 |
| 2,551,849 | Petrilli | May 8, 1951 |
| 2,645,189 | Hansalik | July 14, 1953 |
| 2,659,338 | Harrison | Nov. 17, 1953 |
| 2,659,339 | Harrison | Nov. 17, 1953 |